Sept. 22, 1936.   F. J. CHANDLER   2,055,002
PROCESS OF PRODUCING FORAMINOUS COATED MATERIAL
Filed March 28, 1936
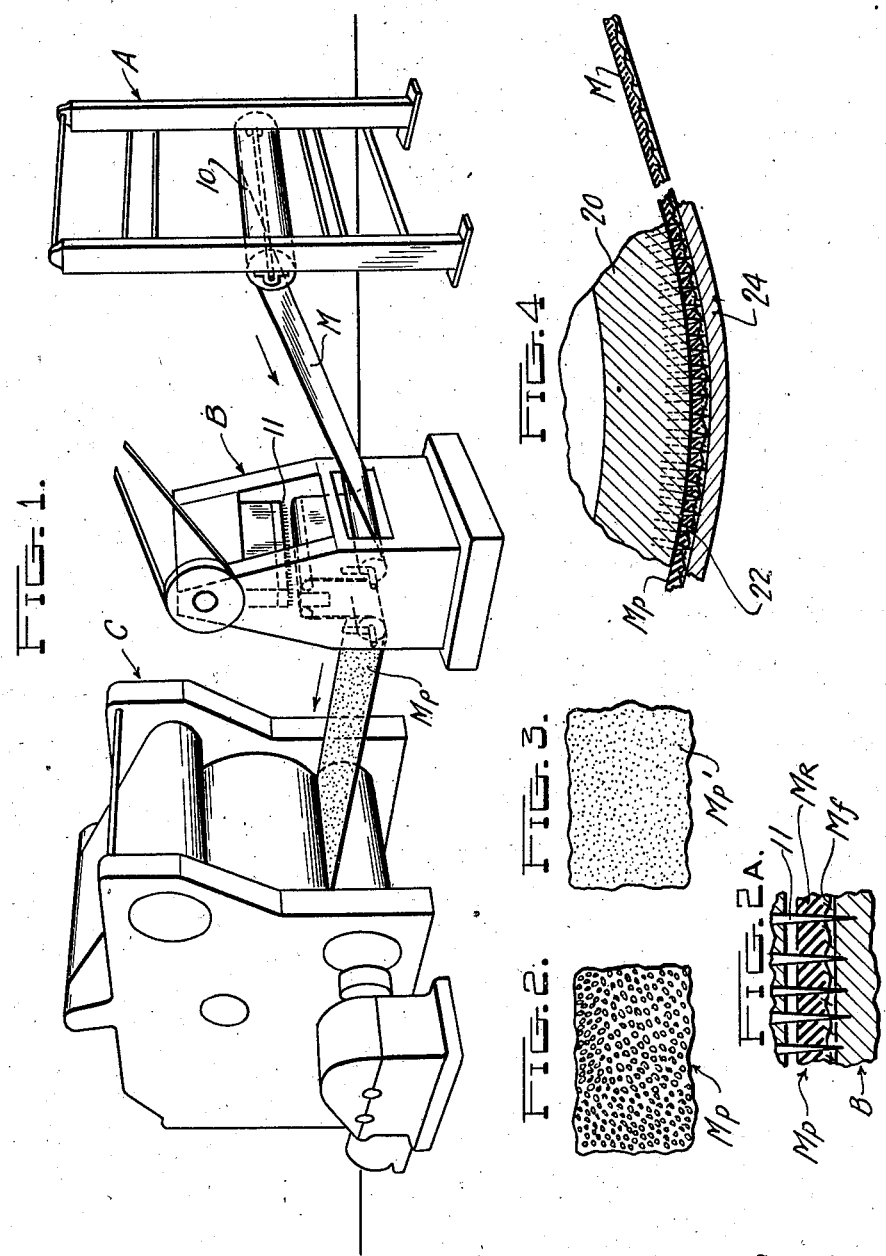
Inventor
Frank Jermain Chandler Patented Sept. 22, 1936

2,055,002

UNITED STATES PATENT OFFICE 2,055,002

PROCESS OF PRODUCING FORAMINOUS COATED MATERIAL

Frank Jermain Chandler, Toledo, Ohio

Application March 28, 1936, Serial No. 71,476

3 Claims. (Cl. 18—55)

This invention relates to rubber coated fabrics which are unavailable for many purposes because of the fact that air will not pass through them. Shoes, clothing, etc., require a certain amount of ventilation in the fabrics used for such purposes, in order to secure comfort for the wearer.

The purpose of this invention is to provide a process whereby ventilation is secured in a live rubber fabric or a composite fabric having a live rubber element; also this process accomplishes the ventilation without damage to the fabric element or elements of the composite material.

Previous efforts to produce adequate ventilation in live rubber have been unsuccessful, due to the fact that holes so produced were immediately closed by the elastic action of the rubber as soon as the perforating means was removed.

While fabrics so treated were porous under pressure, to some extent, this porosity was insufficient for such purposes as clothing or shoes.

The process of the present invention, produces a normal porosity in rubber or composite fabric, such process being diagrammatically illustrated in the appended drawing, in which—

Figure 1 is a schematic layout of the apparatus illustrating the steps of the process;

Figure 2 is fragmentary plan view showing a small section of goods with the ventilating holes as they would appear before curing;

Figure 2A is an enlarged section showing the perforating means in engagement with the material;

Figure 3 is a fragmentary plan view of the same goods as shown in Figure 2, showing the holes as they appear after curing; and Figure 4 illustrates an alternate method of accomplishing the results of this process.

In Figure 1 A is a stand for holding rolls of uncured and unventilated material. Such a roll 10 is shown feeding material into the intrusive perforating unit B which unit produces a ventilated condition in the uncured material. This unit B may be a reciprocating press as shown, the platen carrying intrusive perforating points 11, or it may be a roller machine of some desired type in which the roller passes over the material, and carries a multiplicity of intrusive perforating elements.

Uncured perforated material $M_p$ as shown in Figures 1 and 2 is fed from the unit B to a curing or vulcanizing unit C where it is given elasticity and the holes in the rubber reduced to the desired size, by the curing process, as shown in Figure 3 where the cured perforated material is designated as $M_p'$.

As shown in Figure 2A the points 11 of the unit B are substantially conical in form and pass through the material without cutting or damaging the fabric portion $M_f$.

The curing or vulcanizing unit C as shown in Figure 1 is of the pressure band and drum type, in which the material to be treated is squeezed against a heated drum by a moving pressure band thus vulcanizing the rubber by heat and pressure.

Figure 4 illustrates an alternate form of the invention in which the curing and perforation of the material are performed substantially at the same time. A vulcanizing drum 20 is heated and revolved by means not shown. The surface of this drum is provided with a multiplicity of intrusive points 22, and these points are forced through the material by the action of a pressure band 24. By this means the holes are formed in the uncured rubber and the curing continues with the perforating elements in engagement with the material.

It should be understood that while the alternate process as shown in Figure 4 is necessarily a continuous one, the process as shown in Figures 1 and 2 may be intermittent, or the uncured material may be perforated and stored to be cured at some later time.

A cardinal feature of this invention resides in a new and improved process of producing foraminous coated material by which relatively flexible sheet material, such as textile fabric, is provided with a coating of substantially plastic, semiplastic or unvulcanized rubber. The material so coated is then perforated, preferably intrusively, so that a multiplicity of perforations, preferably of irregular arrangement, are formed in the coating and the material. These perforations are of a larger size than those ultimately desired, so that by thereafter subjecting the coating to a curing or vulcanization process, the size of the perforations is reduced to that desired. The final product is thereby provided with a multiplicity of minute openings which are undiscernible except upon close inspection and by placing the material up to a relatively strong light. Such material has the breathing or ventilating properties desired in connection with articles of clothing, such as shoes, etc.

Also the speed of the various elements B and C need not be the same, as they may operate on different rolls of material. It is also to be understood that the apparatus shown in the drawing is typical only, and changes and rearrangement of same may take place without departing from the spirit of this invention.

What I claim is:

1. A process of producing a foraminous rubber coated textile fabric material which consists in providing a sheet of textile fabric material having a coating of unvulcanized rubber, perforating the unvulcanized rubber coating without cutting out the fabric material to produce openings, and thereafter vulcanizing the coating.

2. A process of producing a foraminous rubber coated textile fabric material which consists in providing a sheet of textile fabric material having a coating of unvulcanized rubber, piercing the material with the rubber coating in unvulcanized condition by a needle-like instrument thereby to perforate the coating to provide minute openings and spread apart the fabric strands, and thereafter vulcanizing the rubber coating.

3. A process of producing a foraminous rubber coated textile fabric material, which consists in providing a sheet of textile fabric material having a coating of unvulcanized rubber, simultaneously forming a multiplicity of minute perforations in the rubber coating in its unvulcanized condition and spreading apart the fabric strands in the region of such perforations respectively, and thereafter vulcanizing the rubber coating and thereby reducing the size of the perforations.

FRANK JERMAIN CHANDLER.